(12) United States Patent
Chen et al.

(10) Patent No.: US 8,587,332 B2
(45) Date of Patent: Nov. 19, 2013

(54) ELECTRONIC PROTECTION MODULE

(75) Inventors: Yu-Tsung Chen, Taipei County (TW);
Yun-Han Chang, Taipei County (TW);
Jason Hsieh, Taipei County (TW);
Chien Hung Kuo, Taipei County (TW)

(73) Assignee: Uniform Industrial Corp., Tu Cheng, Taipei County (TW)

( * ) Notice: Subject to any disclaimer, the term of this patent is extended or adjusted under 35 U.S.C. 154(b) by 318 days.

(21) Appl. No.: 13/019,049

(22) Filed: Feb. 1, 2011

(65) Prior Publication Data

US 2012/0043958 A1    Feb. 23, 2012

(30) Foreign Application Priority Data

Aug. 20, 2010  (TW) .............................. 99216072 U

(51) Int. Cl.
*G01R 31/302*    (2006.01)
(52) U.S. Cl.
USPC .. 324/750.26; 324/555; 324/627; 324/750.13

(58) Field of Classification Search
USPC ........................................................ 324/76.11
See application file for complete search history.

(56) References Cited

U.S. PATENT DOCUMENTS 8,251,289 B2 *  8/2012  Chen .............................. 235/435

\* cited by examiner

*Primary Examiner* — Thomas Valone
(74) *Attorney, Agent, or Firm* — Muncy, Geissler, Olds & Lowe, PLLC

(57) ABSTRACT

An electronic protection module adapted for an electronic device to protection information read and stored in a signal reading element. The electronic protection module includes a circuit board, a first loop, a cover, a first flexible circuit board with a second loop, a second flexible circuit board with a third loop, electrical conductor(s) and conductive element(s). When one of the first loop, second loop and the third loop is disconnected, the signal reading element will be disconnected and lose the information, thereby preventing information leak from the electronic device. The electronic device may be a card reader capable of reading a barcode type, magnetic strip type or chip type of a financial card, credit card or personal identity card.

7 Claims, 4 Drawing Sheets

ELECTRONIC PROTECTION MODULE

CROSS-REFERENCES TO RELATED APPLICATIONS

This non-provisional application claims priority under 35 U.S.C. §119(a) on Patent Application No. 99216072 filed in Taiwan, R.O.C. on Aug. 20, 2010, the entire contents of which are hereby incorporated by reference.

BACKGROUND OF THE INVENTION

1. Field of Invention

The present invention relates to an electronic protection module, in particular, to an electronic protection module adapted to prevent information theft.

2. Related Art

Accompanying the progress of technologies, a smart card embedded with a chip or a magnetic strip has become a popularly used accessory to daily life. For example, a smart card may be used as a credit card or electronic wallet in retail stores, or for various other usages such as electronic shopping, entry control, membership management, or parking management. However, security issues such as smart card duplication, fraudulent use and information leaks are frequently reported in newspapers, and are now considered seriously by the public. During the transaction the retailer's electronic cash register system involves important elements such as microprocessors, smart card reader and memory to record transaction information and the personal information of consumers.

During the consumer's payment, the retailer uses a laser scanner to read barcodes of the goods sold to count the prices, add up sales statistics, and input the consumer's personal information. By combining this information with the smart card, the personal information of the consumer is obtained through the smart card, which can allow the retailer to manage the consumer's information, analyze the consumer's purchasing behaviors, and act as a reference for business operations.

Therefore, once the electronic cash register system is invaded the consumer's information stored in the electronic cash register system could be leaked and cause the retailer loss, due to the electronic cash register system's capability of storing consumer information. As a result, effective prevention of consumer information leak and avoidance of monetary loss and reputation damage to financial organizations and the public, has become a critical issue in need of resolution.

SUMMARY

Accordingly, the present invention provides an electronic protection module to protect information read and stored in a signal reading element. The electronic protection module includes a circuit board, a first loop, a cover, a first flexible circuit board, second flexible circuit board(s), electrical conductor(s) and conductive element(s). The circuit board has a first face and a second face. The first loop is formed by wire mesh and has first contact(s) located on the first face of the circuit board and a second contact located on the second face of the circuit board. The cover covers on the circuit board. The first flexible circuit board, formed by wire mesh, has a second loop with a third contact. The first flexible circuit board is attached to the inner surface of the cover. The second flexible circuit board has a third loop formed by wire mesh. One end of the second flexible circuit board connects electrically with the signal reading element and connects electrically with connecting contact(s) to cause the signal reading element and the first loop to connect. The electrical conductor connects electrically with the first loop and the second loop. The electrical conductor has a first end and a second end opposite to the first end. The first end connects with the second contact to drive the first loop to the connected state; the second end connects with the third contact to drive the second loop to the connected state. The conductive element is covered by the cover, and connects electrically with the first contact to drive the first loop to the connected state. When one of the first loop, the second loop and the third loop are caused to disconnect, the signal reading element is caused to disconnect and lose access to the information.

In an embodiment of the present invention, an electronic protection module is installed inside an electronic device; such an electronic device may be a card reader capable of reading a barcode type, magnetic strip type or chip type of a financial card, credit card or personal identity card. When the card reader is damaged by an improper external force while reading the information stored in the card reader, information leak and illegal duplication are prevented since the electrical loops (the first loop, second loop and the third loop), of the electronic protection module cause the electronic protection module to disconnect and cause the electronic protection module to erase the information protected by the electronic protection module, thereby preventing fraudulent usage and business losses.

In an embodiment of the present invention, the electronic device has a microprocessing element and a data storing element to perform functions such as reading card signals, computing data, storing data etc., which may be installed in the signal reading element or the electronic protection module formed by the first flexible circuit board, second flexible circuit board and the circuit board. The electronic protection module and the signal reading element forms a protection mesh to provide physical protection and protect the operation process of the information. No external force will be able to cause information theft or information leak during signal reading, information computing, or signal storing.

Preferred embodiments of the present invention and efficacies thereof will be illustrated in detail below with the accompanying drawings.

BRIEF DESCRIPTION OF THE DRAWINGS

The present invention will become more fully understood from the detailed description given herein below for illustration only, and thus not limitative of the present invention, wherein.

DETAILED DESCRIPTION OF THE INVENTION

Figure 1:
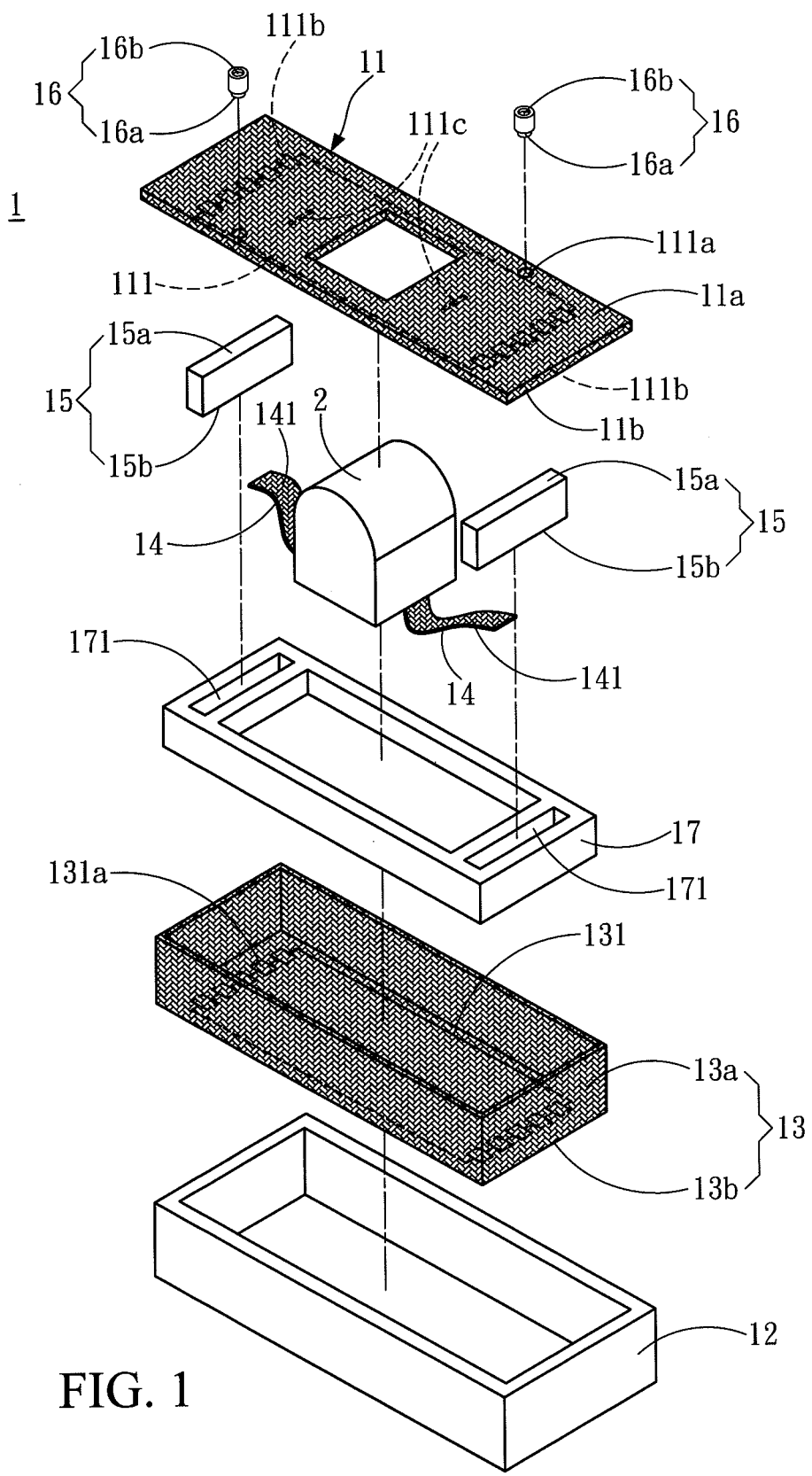
FIG. 1 is an exploded view of an electronic protection module according to a first embodiment of the present invention.
Figure 2:
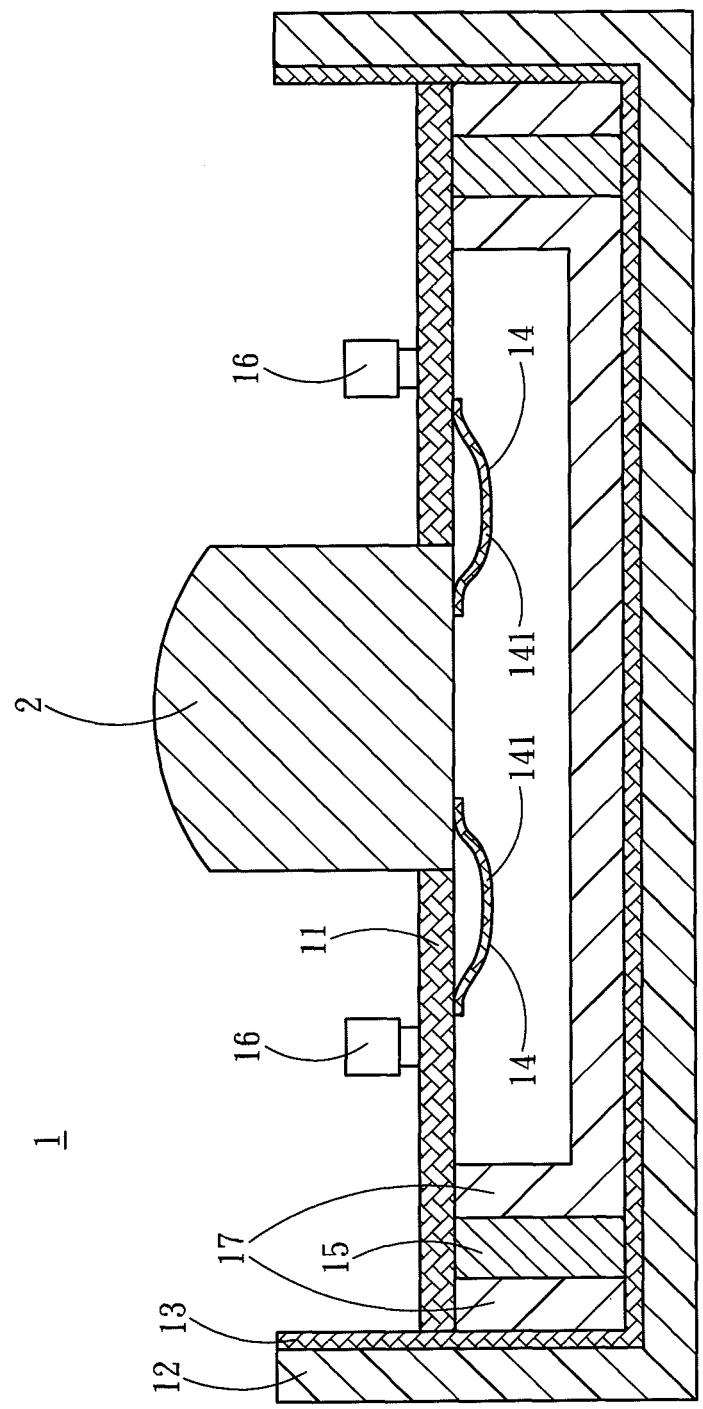
FIG. 2 is a cross-sectional view of the electronic protection module according to the first embodiment of the present invention.
Figure 3:
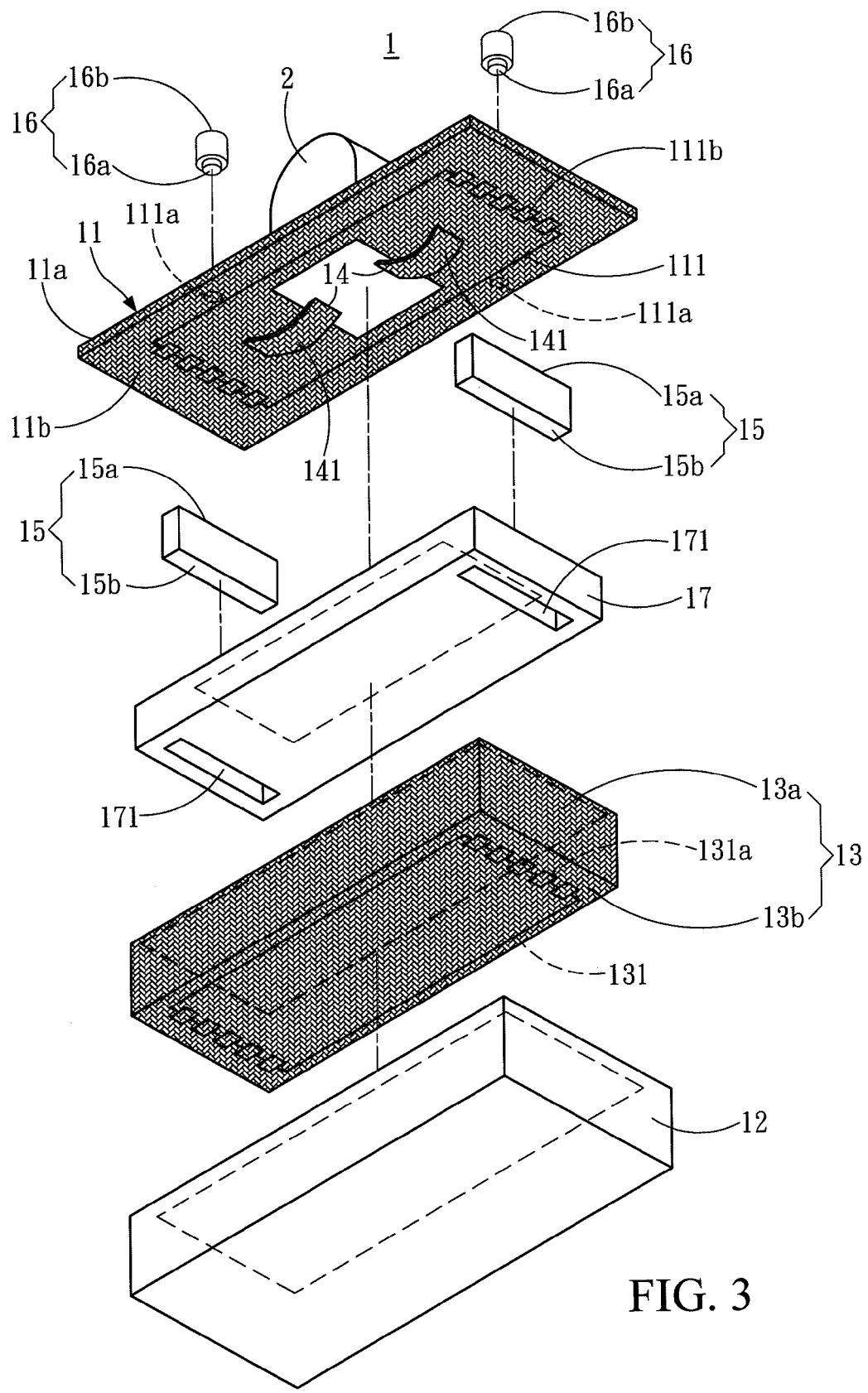
FIG. 3 is another exploded view of the electronic protection module in a different view angle according to the first embodiment of the present invention.

Please refer to FIG. 1 to FIG. 3, which disclose an electronic protection module 1 according to a first embodiment of the present invention. The electronic protection module 1 is adapted to protect information read and stored by a signal reading element 2. The electronic protection module 1 mainly includes a circuit board 11, a first loop 111, a cover 12, a first flexible circuit board 13, second flexible circuit board(s) 14, electrical conductor(s) 15 and conductive element(s) 16.

The circuit board 11 includes a first face 11a and a second face 11b.

The first loop 111 is formed by wire mesh on the circuit board 11; wherein the first loop 111 may located on the external surface or inner layer of the circuit board 11. The first loop 111 includes first contact(s) 111a located on the first face 11a, and second contact(s) 111b and connecting contact(s) 111c located on the second face 11b. The number of each of the first contact 111a, second contact 111b and connecting contact 111c may be one or more, and is not limited in the present invention.

The cover 12 covers the circuit board 11 near the lateral sides of the second face 11b of the circuit board 11. The preferred structure or shape of the cover 12 may be a rectangular or square five-face cover and made of metal. The structure, shape or material mentioned here is only explanatory, and not specifically limited in the present invention.

The first flexible circuit board 13 is completely attached to the internal surface of the cover 12. The first flexible circuit board 13 includes a second loop 131 with third contact (s) 131a. The aforesaid second loop 131 is formed by wire mesh, and the number of the third contact 131a may be one or more than one, which is not limited in the present invention. In addition, the first flexible circuit board 13 has an opposite top face 13a and bottom face 13b; the third contact 131a is located on the top face 13a, and the bottom face 13b is attached securely to the internal surface of the cover 12.

The second flexible circuit board 14 includes a third loop 141 formed by wire mesh. One end of the second flexible circuit board 14 is electrically connected to the signal reading element 2, with the other end of the second flexible circuit board 14 connecting with the connecting contact 111c of the circuit board 11, thereby electrically connecting the signal reading element 2 and the first loop 111. The number of the second flexible circuit board 14 may be one or more than one, which is not limited in the present invention. Furthermore, the signal reading element 2 is preferably a card reading elements that receives signals.

The electrical conductor 15 connects electrically with the first loop 111 and the second loop 131. The electrical conductor 15 is made of conductive material and has an opposite first end 15a and second end 15b. The first end 15a connects with the second contact 111b; when the second end 15b is connected with the third contact 131a, the second loop 131 is caused to connect.

The conductive element 16 includes an opposite bottom 16a and top 16b; wherein the bottom 16a connects electrically with the first contact 111a, and the top 16b includes an insulator. When the conductive element 16 connects electrically with the first contact 111a, the first loop 111 is caused to connect. Furthermore, the electrical conductor 15 and the conductive element 16 preferably include conducting rubber respectively.

When one of the first loop 111, second loop 131 and third loop 141 is disconnected, the signal reading element 2 will be disconnected and will lose the information read and stored therein.

In a preferred example of the present embodiment, the electronic protection module 1 further includes a frame 17 that props the first flexible circuit board 13 against an inner face of the cover 12; the frame 17 also includes a positioning hole 171 adapted to position the electrical conductor 15 on the frame 17.

As mentioned previously, the electronic protection module 1 according to the present invention will cause the first loop 111, second loop 131 or the third loop 141 to disconnect in the following situations.

(1) When the electrical conductor 15 is detached from the second contact 111b and/or the third contact 131a, the first loop 111 and the second loop 131 will be disconnected.

(2) When the conductive element(s) 16 is detached from one or more of the first contact(s) 111a, the first loop 111 will be disconnected.

(3) When the wire meshes that form the first loop 111, second loop 131 or third loop 141 are damaged respectively, the first loop 111, second loop 131 and the third loop 141 will be disconnected respectively.

A second embodiment of the present invention discloses an electronic device 3, which includes an electronic protection module 1, a signal reading element 2, a housing 21, a microprocessing element (not shown), and a data storing element (not shown). The electronic device 3 is preferably one of various types of reading devices to read various barcode type, magnetic type or chip type of starting media; wherein the starting media maybe smart cards such as a financial card, credit card or personal identification card. Here, the electronic protection module 1 is the same as described in the first embodiment.

Figure 4:
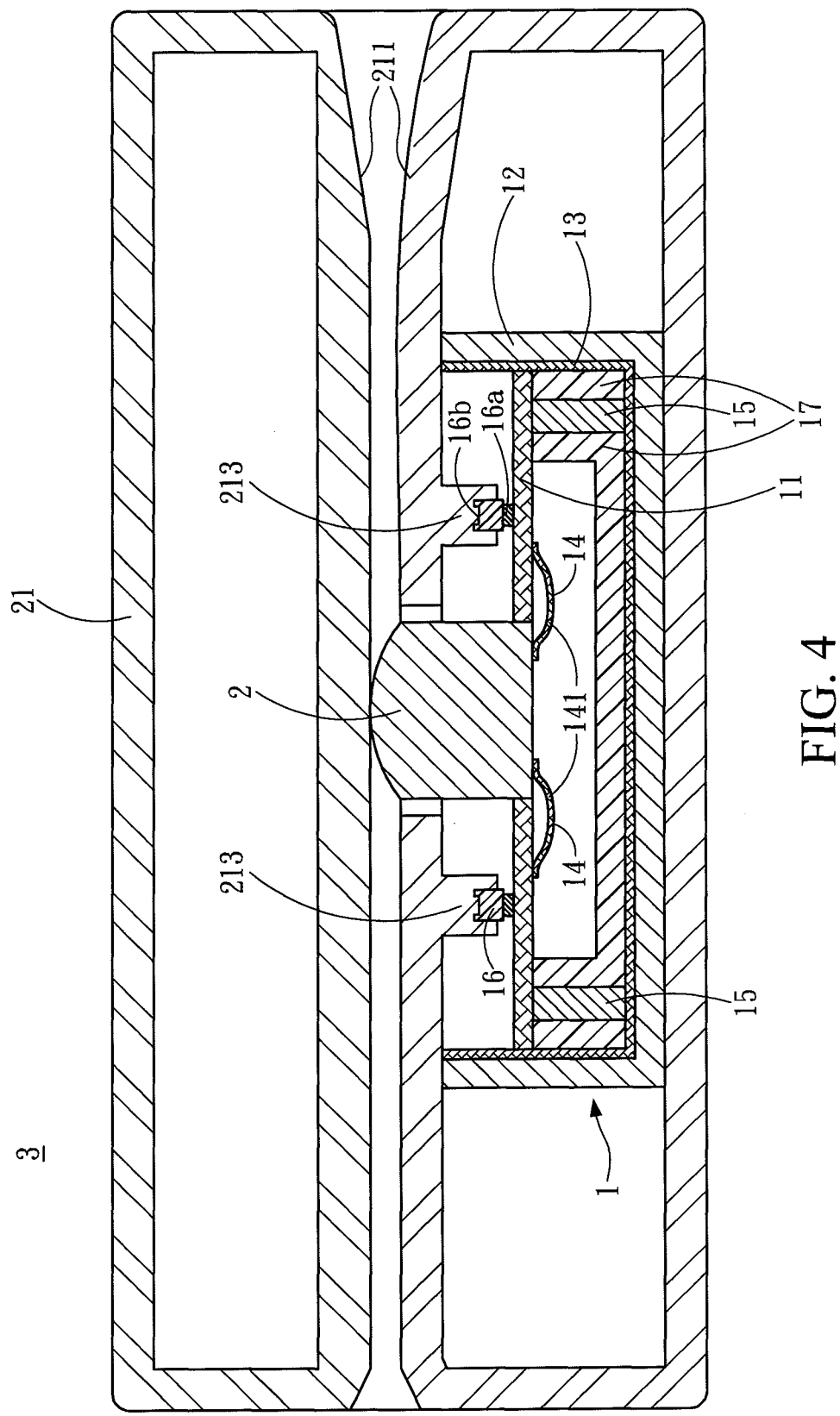
FIG. 4 is a cross-sectional view of an electronic protection module according to a second embodiment of the present invention.

Please refer to FIG. 4, in which the signal reading element 2 connects electrically with the first loop 111 through the second flexible circuit board 14, and includes a signal reading circuit loop (not shown). Moreover, the electronic device 3 may include other composition elements, such as: operation buttons (not shown), screen (not shown), and network connecting module (not shown), etc.; the examples mentioned here are only for explanatory purposes and should not be considered as specific limitations of the present invention.

The housing 21 may be made of plastic material. The electronic protection module 1 is located inside the housing 21. The housing 21 includes a card slot 211 and first mounting part(s) 213. The first mounting part 213 is adapted to position the conductive element 16; where the top 16b of the conductive element 16 is positioned on the first mounting part 213. The insulator of the top 16b mentioned above is adapted to electrically isolate the conducting element 16 from the housing 21 or the signal reading element 2.

The microprocessing element and the data storing element is preferably disposed on the signal reading element 2 or on the second face 11b of the circuit board 11 in the electronic protection module 1. Furthermore, one end of the signal reading element 2 connects electrically with one end of each of the plural second flexible circuit boards 14; the other end of each of the second flexible circuit board 14 connects electrically with the connecting contact 111c of the first loop 111. In addition, the other end of the signal reading element 2 is extended to be expose from the card slot 211, so as to receive the signals of the starting media (not shown); wherein the starting media maybe MSR cards or smart cards such as a financial card, credit card or personal identification card. When the starting media is inserted into the card slot 211, the signals of the starting media are received by the signal reading circuit loop inside the signal reading element 2 to obtain and store the information of the starting media in the data storing element located in the signal reading element 2 or in the electronic protection module 1. As mentioned previously, when the electronic device 3 is dismounted and damaged, the first loop, second loop and the third loop will be disconnected, thereby causing the signal reading element 2 to disconnect; the information stored in the data storing element located in the signal reading element 2 or the electronic protection module 1 will be lost and cannot be read.

According to what has been disclosed previously, the present invention protects the information stored in the electronic device through the following methods.

(A) When the cover is dismounted and removed from the circuit board, the electrical conductor will be removed from the second contact or third contact, thereby causing the first loop and the second loop to be disconnected.

(B) If the housing is dismounted, the conductive element and the first contact of the circuit board will be separated and cause the first loop to be disconnected, (C) Since the first flexible circuit board is attached to the inner surface of the cover, when the cover is abraded and broken through, the wire mesh of the first flexible circuit board will be damaged and causing the second loop to be disconnected.

(D) Since the second flexible circuit board connects electrically with the signal reading element and the first loop, when the signal reading element is pulled and the second flexible circuit board is separated from the signal reading element or the connecting contact, the third loop will be disconnected.

When one of the first, second and third loops is disconnected, the signal reading element will be disconnected, thereby causing the electrical protection module to erase or lose access to the information stored in the data storing element. As a result, the stored information of the electronic device cannot be read, preventing information theft and business loss.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electronic protection module adapted to protect information read and stored by a signal reading element, comprising:
    a circuit board, having a first face and a second face;
    a first loop formed by wire mesh and located on the circuit board, comprising:
    a first contact located on the first face;
    a second contact and a connecting contact located on the second face; and
    a cover covering the circuit board;
    a first flexible circuit board, being attached to an inner surface of the cover and having a second loop with a third contact, the second loop being formed by wire mesh;
    a second flexible circuit board, having one end electrically connecting with the signal reading element, and the other end electrically connecting with the connecting contact so that the signal reading element and the first loop are electrically connected, the second flexible circuit board further comprising a third loop formed by wire mesh;
    an electrical conductor electrically connecting with the first loop and the second loop, comprising:
    a first end, connecting with the second contact to drive the first loop to a connected state; and
    a second end opposite to the first end, connecting with the third contact to drive the second loop to the connected state; and
    a conductive element covered by the cover, electrically connecting with the first contact to drive the first loop to the connected state;
    wherein when one of the first loop, the second loop and the third loop is disconnected, access to the information stored in an electronic device is lost.

2. The electronic protection module of claim 1 further comprising a frame that props the first flexible circuit board against an inner face of the cover, and the electrical conductor is disposed on the frame.

3. The electronic protection module of claim 1, wherein the first flexible circuit board comprises a top face and a bottom face opposite to each other, the third contact being located on the top face, and the bottom face being attached to the inner face of the cover.

4. The electronic protection module of claim 1, Wherein the conductive element comprises:
    a bottom, electrically connecting with the first contact; and
    a top opposite to the bottom, comprising an insulator.

5. The electronic protection module of claim 1, wherein the electrical conductor is separated from the second contact or the third contact, the first loop and the second loop are disconnected.

6. The electronic protection module of claim 1, wherein when the conductive element is separated from the first contact, the first loop is disconnected.

7. The electronic protection module of claim 1, wherein when the second flexible circuit board is separated from the signal reading element or the connecting contact, the third loop is disconnected.

* * * * *